United States Patent [19]
Hachiya et al.

[11] Patent Number: 5,762,851
[45] Date of Patent: Jun. 9, 1998

[54] METHOD OF PRODUCING POLYCARBONATE PELLETS

[75] Inventors: Hiroshi Hachiya; Kyosuke Komiya, both of Kurashiki, Japan

[73] Assignee: Asahi Kasei Kogyo Kabushiki Kaisha, Osaka, Japan

[21] Appl. No.: 783,456

[22] Filed: Jan. 16, 1997

[30] Foreign Application Priority Data

Jan. 16, 1996 [JP] Japan ................................. 8-021644

[51] Int. Cl.⁶ ............................................. B29C 47/78
[52] U.S. Cl. .................... 264/211.24; 528/196; 528/198; 528/499; 528/502; 524/151; 524/611; 524/706; 524/742; 269/176.1
[58] Field of Search ........................... 528/198, 196, 528/502, 499; 524/611, 706, 742, 151; 264/176.1, 211.24

[56] References Cited

U.S. PATENT DOCUMENTS 5,364,926  11/1994  Sakashita et al. .................. 528/198
5,502,153  3/1996  Sakashita et al. .................. 528/198

FOREIGN PATENT DOCUMENTS 6-88251     11/1994  Japan .
07009439A   1/1995   Japan .

*Primary Examiner*—Jeffrey Stucker
*Attorney, Agent, or Firm*—Birch, Stewart, Kolasch & Birch, LLP

[57] ABSTRACT

A method for producing a polycarbonate pellet which comprises subjecting a melt-extruded polycarbonate to a cooling step and a cutting step, the steps being carried out in either order or simultaneously, and wherein the cooling step is performed by contacting the polycarbonate with a cooling water having an electric conductivity of 1 mS/cm or less as measured at 25° C.

9 Claims, No Drawings

METHOD OF PRODUCING POLYCARBONATE PELLETS

BACKGROUND OF THE INVENTION

1. Field of The Invention

The present invention relates to a polycarbonate pellet and a method for producing the same. More particularly, the present invention is concerned with a polycarbonate pellet improved with respect to the suppression of occurrence of crazing, and a method for producing the same. The polycarbonate pellet of the present invention improved with respect to the suppression of occurrence of crazing can be obtained by a pelletization method comprising subjecting a melt-extruded polycarbonate to cooling and cutting in this or reverse order or simultaneously, wherein the cooling is performed using cooling water having an electric conductivity of 1 mS/cm or less as measured at 25° C. From the polycarbonate pellet of the present invention, a molded polycarbonate product can be obtained which is improved with respect to the suppression of occurrence of crazing even when the product has experienced moist heat environment conditions.

2. Prior Art

Polycarbonates have been widely used in various fields as engineering plastics which have excellent heat resistance, impact resistance and transparency.

However, polycarbonates have a problem in that, when polycarbonates have been used in a field (such as the medical field and food-related field) in which the polycarbonates are repeatedly subjected to sterilization by means of hot water or steam, the polycarbonates suffer the occurrence of crazing. With occurrence of crazing in polycarbonates, not only the mechanical properties but also the appearances of the polycarbonates become lowered. Further, there is also a problem such that, when polycarbonates used in an optical field, such as an optical disc, have experienced moist heat environment conditions, the polycarbonates suffer the occurrence of crazing, so that the polycarbonates become optically defective. Therefore, it has been desired to prevent the occurrence of crazing in polycarbonates.

It is known that foreign matters in a polycarbonate provide a cause of the occurrence of crazing. Specifically, the mechanism of the occurrence of crazing is presumed to be as follows. When a polycarbonate which has once experienced moist heat is placed under room temperature conditions, the polycarbonate releases the moisture which has been absorbed in the polycarbonate at exposure to the moist heat. The released moisture cannot go out of the polycarbonate, but rather gathers at foreign matters within the polycarbonate. As a result, stress is generated around the foreign matters in the polycarbonate at which the moisture gathers, and the stress produces crazing.

In order to prevent the occurrence of crazing, several proposals have been made for the prevention of entry of foreign matters (such as dust) into a polycarbonate. For example, with respect to a polycarbonate produced by the so-called phosgene process, a method for producing a low dust content polycarbonate has been proposed in which a phosgene process polycarbonate (which usually contains water and a solvent) is directly fed to a vented extruder without being subjected to drying (during which a large amount of a foreign matter is likely to enter a phosgene process polycarbonate) (see Japanese Patent Application Laid-Open Specification No. 1-149827 corresponding to U.S. Pat. No. 4,845,193). With respect to a polycarbonate produced by the melt process (transesterification process), a method for decreasing the possibility of entry of a foreign matter into the polycarbonate during an operation for the incorporation of an additive has been proposed. In this method, a melt process polycarbonate, which is produced in the molten state upon the transesterification, as such is mixed with an additive and subjected to melt-kneading, without being subjected to pelletization before the mixing with the additive (see Japanese Patent Application Laid-Open Specification No. 5-239334 corresponding to U.S. Pat. Nos. 5,364,926 and 5,502,153 and European Patent Application Publication No. 615996A).

Further, an improved pelletization method for a polycarbonate has been proposed in which a polycarbonate is heated and melt-extruded by an extruder through a die, and the extruded polycarbonate in the molten state is cut by means of a rotary knife provided in the vicinity of the die surface, wherein the molten, soft polycarbonate is cut before solidification so that the generation of a knife-derived metallic foreign matter and polycarbonate dust is suppressed (see Japanese Patent Application Laid-Open Specification No. 7-9439). Another polycarbonate pelletization method has also been proposed in which a polycarbonate is shaped into a pellet having a specific arcked columnar shape, which method is intended to suppress a change of the shearing frictional drag of the pellet in a molding machine and achieve a smooth rotation of the screw of the molding machine, so that the generation of a foreign matter at molding is decreased (see Examined Japanese Patent Application Publication No. 6-88251).

However, crazing cannot be satisfactorily suppressed by these conventional methods.

SUMMARY OF THE INVENTION

In this situation, the present inventors have made extensive and intensive studies toward obtaining a polycarbonate pellet improved with respect to the suppression of occurrence of crazing. As a result, it has unexpectedly been found that a polycarbonate pellet remarkably improved with respect to the suppression of occurrence of crazing can be obtained by a pelletization method comprising subjecting a melt-extruded polycarbonate to cooling and cutting in this or reverse order or simultaneously, wherein the cooling is performed using cooling water having an electric conductivity of 1 mS/cm or less as measured at 25° C. Based on this finding, the present invention has been completed.

Therefore, it is an object of the present invention to provide a polycarbonate pellet improved with respect to the suppression of occurrence of crazing.

It is another object of the present invention to provide a method for producing the above-mentioned polycarbonate pellet having excellent properties.

Conventionally, studies have not been made at all about the relationship between the property of cooling water used in the pelletization of a polycarbonate and the occurrence of crazing. In the above-mentioned Japanese Patent Application Laid-Open Specification No. 5-239334, there is a description to the effect that it is preferred to pelletize a polycarbonate in circulated water from which foreign matter has been removed. However, the above-mentioned Japanese patent document has neither description about the electric conductivity of the circulated water nor description about the amount of foreign matter in the circulated water. Further, the above-mentioned Japanese patent document has no description about the relationship between the electric conductivity of cooling water used in the pelletization of a polycarbonate and the occurrence of crazing. In the Working Examples of the above-mentioned Japanese patent document, circulated water which has been filtered with a 0.2-μm filter is used as cooling water. However, it should be noted that the electric conductivity of water cannot be reduced by filtration using an ordinary filter.

The present inventors have for the first time found that the electric conductivity of cooling water used in the pelletization of a polycarbonate, to which no attention has conventionally been drawn, largely affects the quality of the polycarbonate, specifically the occurrence of crazing. The mechanism as to how the electric conductivity of cooling water used in the pelletization of a polycarbonate affects the occurrence of crazing has not yet been elucidated. However, it is presumed that crazing is caused by local absorption of water by ionic substances, and by interactions between ionic substances and a polycarbonate, additives and impurities.

DETAILED DESCRIPTION OF THE INVENTION

According to the present invention, there is provided a polycarbonate pellet improved with respect to the suppression of occurrence of crazing, which is substantially the same product as obtained by a pelletization method comprising subjecting a melt-extruded polycarbonate to cooling and cutting in this or reverse order or simultaneously, wherein the cooling is performed using cooling water having an electric conductivity of 1 mS/cm or less as measured at 25° C.

For easy understanding of the present invention, the essential features and various embodiments of the present invention are enumerated below.

1. A polycarbonate pellet improved with respect to the suppression of occurrence of crazing, which is substantially the same product as obtained by a pelletization method comprising subjecting a melt-extruded polycarbonate to cooling and cutting in this or reverse order or simultaneously, wherein the cooling is performed using cooling water having an electric conductivity of 1 mS/cm or less as measured at 25° C.

2. The polycarbonate pellet according to item 1 above, wherein the cooling water has a foreign matter content of $10^5$/ml or less, as measured at 25° C., in terms of the number of foreign matter particles having a size of from 0.5 to 25 μm.

3. In a method for producing a polycarbonate pellet which comprises subjecting a melt-extruded polycarbonate to cooling and cutting in this or reverse order or simultaneously, the improvement in which the cooling is performed using cooling water having an electric conductivity of 1 mS/cm or less as measured at 25° C.

4. The method according to item 3 above, wherein the cooling water has a foreign matter content of $10^5$/ml or less, as measured at 25° C., in terms of the number of foreign matter particles having a size of from 0.5 to 25 μm.

5. The method according to item 3 above, wherein the cooling water has an electric conductivity of $10^2$ μS/cm or less as measured at 25° C. and has a foreign matter content of $10^4$/ml or less, as measured at 25° C., in terms of the number of foreign matter particles having a size of from 0.5 to 25 μm.

6. The method according to any one of items 3 to 5 above, wherein the cooling water has a temperature in the range of from 40° C. to lower than 100° C.

7. The method according to any one of items 3 to 6 above, wherein, after the cooling of the polycarbonate with the cooling water, the cooling water remaining on the surface of the polycarbonate is removed.

8. The method according to any one of items 3 to 7 above, wherein the polycarbonate is produced by a transesterification reaction between an aromatic dihydroxy compound and a carbonic diester.

The present invention will now be described in detail.

The polycarbonate used in the present invention comprises recurring units each independently represented by the following formula:

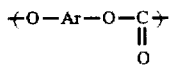

wherein Ar represents a divalent aromatic group having 5 to 200 carbon atoms.

Examples of divalent aromatic groups Ar include a phenylene group, a naphthylene group, a biphenylene group and a pyridylene group, which are unsubstituted or substituted with at least one substituent as described below, and include a group represented by the following formula:

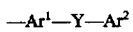

wherein each of Ar and Ar independently represents an arylene group, such as a phenylene group, a naphthylene group, a biphenylene group or a pyridylene group, which is unsubstituted or substituted with at least one substituent as described below, and Y represents an unsubstituted or substituted alkylene group represented by the following formulae:

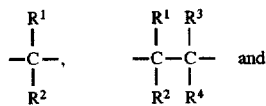

wherein each of $R^1$, $R^2$, $R^3$ and $R^4$ independently represents a hydrogen atom, a lower alkyl group having 1 to 6 carbon atoms, a cycloalkyl group having 5 to 10 carbon atoms, an aryl group having 6 to 30 carbon atoms or an aralkyl group having 7 to 31 carbon atoms; and k represents an integer of 3 to 11; wherein each of $R^1$, $R^2$, $R^3$ and $R^4$ may be substituted with a halogen atom and/or an alkoxy group having 1 to 6 carbon atoms; and wherein at least one hydrogen atom of the group having an integer k may be independently substituted with an alkyl group having 1 to 6 carbon atoms, an aryl group having 6 to 30 carbon atoms or a halogen atom.

The polycarbonate used in the present invention may contain, as a comonomer unit, a divalent aromatic group represented by the following formula:

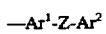

wherein $Ar^1$ and $Ar^2$ are as defined above; and Z represents a single bond, or a divalent group, such as —O—, —CO—, —S—, —SO$_2$, —COO—, or —CON($R^1$)—, wherein $R^1$ is as defined above.

Specific examples of divalent aromatic groups usable in the present invention include groups respectively represented by the following formulae:

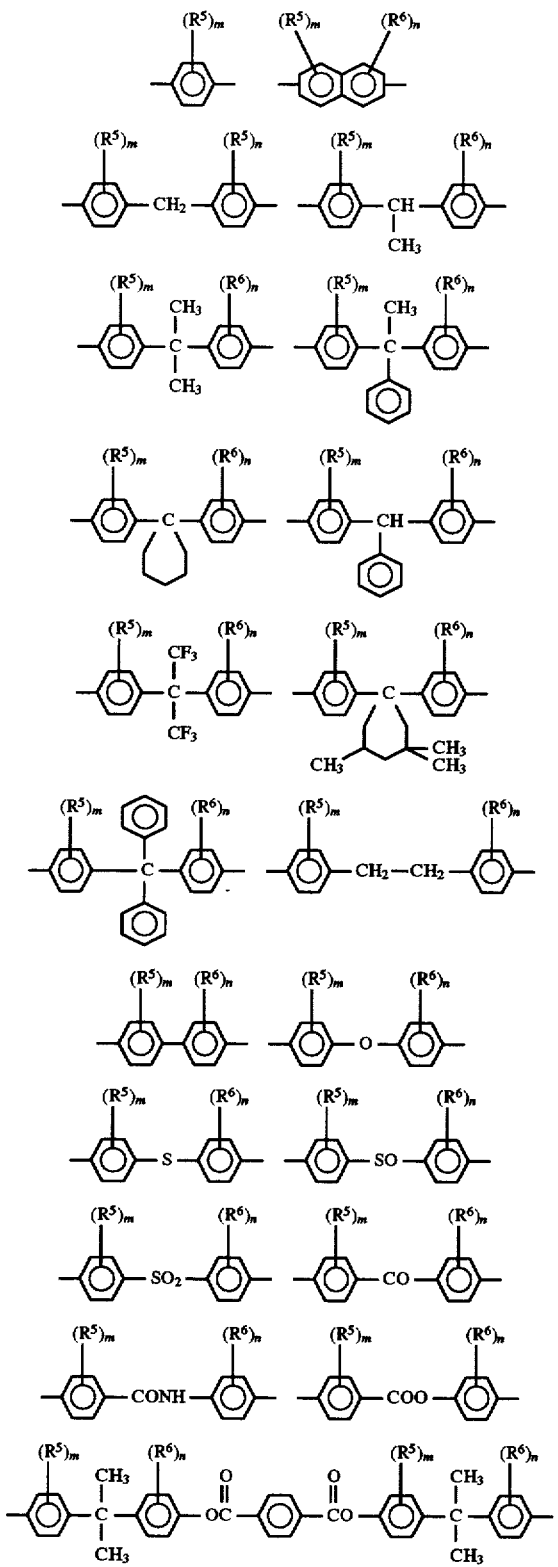

wherein each of $R^5$ and $R^6$ independently represents a halogen atom, an alkyl group having from 1 to 10 carbon atoms, an alkoxy group having 1 to 10 carbon atoms, a cycloalkyl group having 5 to 10 ring-forming carbon atoms, or an aryl group having 6 to 30 carbon atoms; each of m and n independently represents an integer of from 1 to 4, with the proviso that when m is an integer of from 2 to 4, $R^5$'s are the same or different, and when n is an integer of from 2 to 4, $R^6$'s are the same or different.

A preferred example of divalent aromatic groups is a group represented by the following formula:

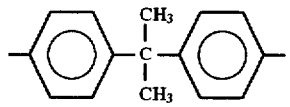

It is especially preferred that the polycarbonate contain 85 mole % or more, based on all of the monomer units in the polycarbonate, of recurring units each having an Ar represented by the above formula.

The polycarbonate used in the present invention may contain, as a comonomer unit, a tri- or more valent aromatic group having 6 to 300 carbon atoms.

With respect to the molecular structures of the terminal groups of the polycarbonate, there is no particular limitation. The terminal groups of the polycarbonate may be at least one member selected from the group consisting of a hydroxyl group, an aryl carbonate group and an alkyl carbonate group. A terminal aryl carbonate group is represented by the following formula:

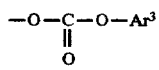

wherein $Ar^3$ represents a monovalent aromatic group having 6 to 30 carbon atoms, wherein the aromatic ring of $Ar^3$ may be unsubstituted or substituted.

Specific examples of terminal aryl carbonate groups include groups respectively represented by the following formulae:

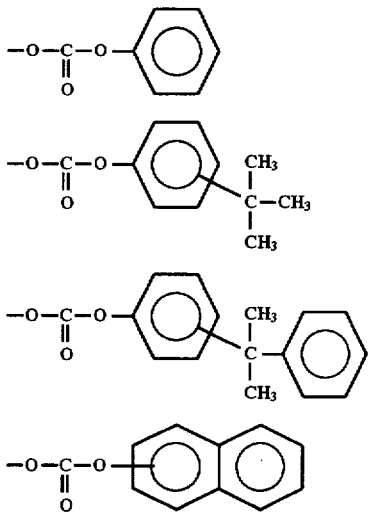

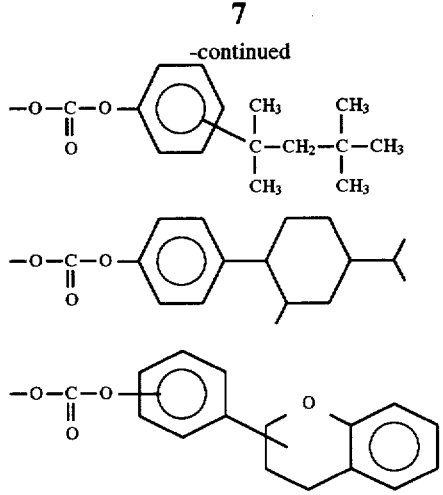

A terminal alkyl carbonate group is represented by the following formula:

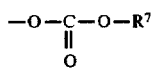

wherein $R^7$ represents a straight chain or branched alkyl group having 1 to 20 carbon atoms.

Specific examples of terminal alkyl carbonate groups include groups respectively represented by the following formulae:

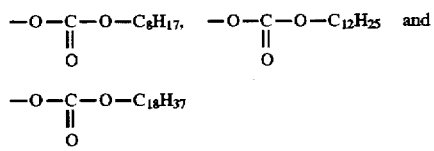

Among these terminal groups, preferred terminal groups are a phenyl carbonate group, a p-t-butylphenyl carbonate group and a p-cumylphenyl carbonate group. With respect to the molar ratio of the terminal hydroxyl groups to the other terminal groups, there is no particular limitation. However, the molar ratio is generally selected in the range of from 1:1,000 to 1,000:1, depending on the use.

With respect to the molecular weight of the polycarbonate used in the present invention, there is no particular limitation. However, the weight average molecular weight of the polycarbonate is generally in the range of from 5,000 to 300,000, preferably from 10,000 to 80,000.

The polycarbonate used in the present invention can be produced by a conventional method. Specifically, the polycarbonate can be produced by, for example, an interfacial polymerization process (e.g., phosgene process) in which an aromatic dihydroxy compound and a carbonate precursor (e.g., phosgene) are reacted with each other in the presence of an aqueous sodium hydroxide solution and methylene chloride as a solvent, a transesterification process (melt process) in which an aromatic dihydroxy compound and a carbonic diester (e.g., a diphenyl carbonate) are reacted with each other, and a solid state polymerization process in which a carbonate prepolymer obtained by the phosgene process or by the melt process is crystallized and subjected to a solid state polymerization (see, for example, Japanese Patent Application Laid-Open Specification Nos. 1-158033, 1-271426 and 3-68627). Among conventional methods, in any of the transesterification processes (such as the melt process, and a solid state polymerization process in which a carbonate prepolymer obtained by the melt process is used), a solvent and a chlorine compound are not used. In addition, in the melt process, a polycarbonate is obtained in the molten state upon the transesterification, so that the possibility of the entry of foreign matters is decreased. Therefore, the transesterification processes (such as the melt process, and a solid state polymerization process in which a carbonate prepolymer obtained by the melt process is used) are preferred since the amounts of chlorine, ionic impurities, foreign matter microparticles (such as dust) and the like can be easily decreased. The melt process is especially preferred. It is easy to purify monomers, such as an aromatic dihydroxy compound and a carbonic diester. Therefore, with respect to the melt process, it is preferred to purify an aromatic dihydroxy compound and a carbonic diester by, for example, distillation or filtration. By performing the melt process by using a purified aromatic dihydroxy compound and a purified carbonic diester, there can be obtained a polycarbonate which is substantially free of a chlorine atom and in which the amounts of ionic impurities and foreign matter particles are small. With respect to the melt process, it is also preferred to take customary measures for the prevention of the entry of foreign matter. Examples of such customary measures include the use of a clean room and the use of a closed system for practicing the production process. It is preferred that the polycarbonate have a foreign matter content of $10^5$/g or less, more preferably $5 \times 10^4$/g or less, still more preferably $1 \times 10^4$/g or less, in terms of the number of foreign matter particles having a size of from 0.5 to 25 μm.

In the present invention, the term "melt-extrusion" means an operation in which a polycarbonate in the molten state is extruded though a die or a nozzle. With respect to the configurations of the die and nozzle, there is no particular limitation. The extrusion can be performed by a conventional method, such as a method using a screw type extruder or a piston type extruder, or a method using a gear pump.

In the present invention, when the polycarbonate is produced by the melt process, the obtained molten polycarbonate as such, or together with additives (such as those mentioned below), can be directly extruded, using an extruder, a gear pump or the like, without the need for being melted before extrusion. Therefore, the melt process is preferred to the phosgene process and the solid state polymerization process, in both of which a polycarbonate is obtained in the solid state and has to be melted in an extruder. Likewise, the use of a molten polycarbonate produced by the melt process is preferred to the re-pelletization of an already formed polycarbonate pellet through molding. In the present invention, the polycarbonate may contain additives, as long as the effects of the present invention are not impaired. Examples of additives include a thermal stabilizer, an antioxidant, a weathering stabilizer, an ultraviolet absorber, a mold release agent, a lubricant, an antistatic agent, a plasticizer, a resin other than a polycarbonate, a polymer such as a rubber, a pigment, a dye, a filler, a reinforcing agent, and a flame retardant. These additives can be used in amounts usually used in the art.

The present invention provides a polycarbonate pellet improved with respect to the suppression of occurrence of crazing, which is substantially the same product as obtained by a pelletization method comprising subjecting a melt-extruded polycarbonate to cooling and cutting in this or reverse order or simultaneously, wherein the cooling is performed using cooling water having an electric conductivity of 1 mS/cm or less as measured at 25° C. The pelletization method in the present invention, which comprises cooling and cutting a melt-extruded polycarbonate, is not particularly limited as long as the cooling is performed using cooling water having the above-mentioned specific, low value of electric conductivity. For example, after melt-extruding a polycarbonate through a die, the pelletization can be performed by a conventional cutting method, such as a strand cut method, a hot cut method, a hot cut method using a small amount of cooling water (e.g., a "hot cut in mist air stream" method) and an under-water cut method. In the strand cut method, a molten resin is extruded through a die in a strand form, and the strand is cut after being cooled with water or while being cooled with water. In the hot cut method, a molten resin extruded through a die is cut by means of a knife provided in the vicinity of the die surface, and the resultant molten resin pellet is cooled with water. In the "hot cut in mist air stream" method, a molten resin extruded through a die is cut by means of a knife provided in the vicinity of the die surface, while cooling the melt-extruded resin by spraying a water mist thereon. In the under-water cut method, a molten resin extruded through a die which is disposed underwater is cut underwater by means of a knife provided in the vicinity of the die surface.

With respect to the diameter and the diameter distribution of the pellet of the present invention, there is no particular limitation.

In the present invention, the method for cooling the molten polycarbonate with cooling water is not particularly limited as long as the molten polycarbonate and cooling water are contacted with each other to solidify the molten polycarbonate. Examples of methods for cooling the molten polycarbonate with cooling water include a cooling method in which a molten resin is extruded directly into water through a die which is disposed in water, and a cooling method in which a molten resin is first extruded into the air or an inert gas through a die which is disposed in the air or an inert gas, and the melt-extruded resin is then cooled by placing it in water or pouring or spraying water thereon. With respect to the method for cooling a molten polycarbonate with cooling water, reference can be made to the above-mentioned Japanese Patent Application Laid-Open Specification No. 5-239334 corresponding to U.S. Pat. Nos. 5,364,926 and 5,502,153 and European Patent Application Publication No. 615996A).

It is requisite that the cooling water used in the present invention have an electric conductivity of 1 mS/cm or less as measured at 25° C. Ordinary tap water and industrial water have an electric conductivity as high as 10 mS/cm or more as measured at 25° C. Water having such a high electric conductivity as such cannot be used in the present invention. When the electric conductivity of the cooling water is higher than 1 mS/cm as measured at 25° C., a molded product obtained from the polycarbonate pellet is likely to suffer vigorous crazing. It is preferred that the cooling water have an electric conductivity of $10^2$ µS/cm or less, more preferably 10 µS/cm or less, as measured at 25° C. In the present invention, it is preferred that the cooling water have not only a low electric conductivity, but also a small foreign matter content. Specifically, it is preferred that the cooling water have a foreign matter content of $10^5$/ml or less, more preferably $10^4$/ml or less, still more preferably $10^3$/ml or less, as measured at 25° C., in terms of the number of foreign matter particles having a size of from 0.5 to 25 µm. When the foreign matter content of the cooling water is higher than $10^5$/ml, a molded product obtained from the polycarbonate pellet tends to suffer crazing. It is especially preferred that the cooling water have an electric conductivity of $10^2$ µS/cm or less as measured at 25° C. and have a foreign matter content of $10^4$/ml or less, as measured at 25° C., in terms of the number of foreign matter particles having a size of from 0.5 to 25 µm.

With respect to the method for obtaining water which can be used in the present invention as cooling water, there is no particular limitation, and various methods can be used. Examples of methods for reducing the electric conductivity of water include distillation and ion exchange treatment. Examples of methods for reducing the foreign matter content of water include distillation, filtration, and precision filtration using a precision filtration membrane and an ultra-filtration membrane. These methods may be used in combination. If desired, an operation using any of these methods may be repeatedly performed. By using the above-mentioned methods, there can be removed ions, such as chlorine ions, nitric acid ions, silicic acid ions, carbonic acid ions, alkali metal ions and iron ions, and foreign matters, such as organic substances, dust and sand. With respect to ions, it is preferred to reduce the amount of alkali metal ions in water. It is especially preferred that each of the respective amounts of sodium ions and iron ions in water be reduced to 1 ppm by weight.

In the present invention, the term "foreign matter" means a minute substances capable of scattering a laser beam. Examples of such minute substances include sand grains, particles of mineral substance, metal particles, particles of organic substance, and dust.

In the present invention, the electric conductivity can be measured by means of an electric conductivity meter. The foreign matter content in terms of the number of foreign matter particles having a size of from 0.5 to 25 µm can be measured by means of a particle measuring apparatus.

After the polycarbonate has been cooled with the cooling water and then the cooling water remaining on the surface of the polycarbonate has been evaporated, ionic substances and foreign matters in the cooling water remain on the surface of the polycarbonate. Therefore, it is preferred to remove the cooling water remaining on the surface of the polycarbonate. This removal can be performed by subjecting the polycarbonate carrying the cooling water remaining thereon to, for example, a clean-air blow or centrifugation, thereby causing the remaining cooling water to scatter away from the surface of the polycarbonate.

It is preferred that the cooling water have a temperature in the range of from 40° C. to lower than 100° C. When the temperature of the cooling water is lower than 40° C., it is likely that the polycarbonate is caused to have vacuum cells generated therein upon the cooling, especially when the pelletization is performed by the strand cut method, so that the obtained pellet has pores opening to the surface thereof. When the pellet has such pores, the amount of the cooling water remaining on the surface of the polycarbonate is increased, and the air in the pores is enclosed in the polycarbonate at molding. As a result, the molded product has poor hot water resistance, and the occurrence of crazing is increased. On the other hand, when the temperature of the cooling water is 100° C. or more the handling of the cooling water becomes difficult.

It is preferred that the polycarbonate has a small foreign matter content. Specifically, it is preferred that the polycarbonate have a foreign matter content of $10^5$/g or less, more preferably $5 \times 10^4$/g or less, still more preferably $1 \times 10^4$/g or less, in terms of the number of foreign matter particles having a size of from 0.5 to 25 µm.

With respect to the molding method for obtaining a molded product from the pellet of the present invention, there is no particular limitation, and any of known molding methods, such as injection molding, can be used.

The polycarbonate pellet of the present invention is improved with respect to the suppression of occurrence of crazing even when the pellet has experienced moist heat environment conditions. Therefore, the polycarbonate pellet of the present invention can be advantageously used for the production of a molded polycarbonate product which is suitable for use in fields (such as the medical field and food-related field) in which a molded polycarbonate product is repeatedly subjected to sterilization by means of hot water or steam, and an optical field (such as an optical disc) in which an optical defect caused by the occurrence of crazing in a molded polycarbonate product is a serious problem.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, properties were measured as follows.

(1) Electric conductivity

An electric conductivity was measured at 25° C. by using an electric conductivity meter manufactured and sold by DKK Corporation, Japan.

(2) Foreign matter content in terms of the number of foreign matter particles having a size of from 0.5 to 25 µm The foreign matter content was measured at 25° C. by using a particle measuring apparatus HIAC/ROYCO (registered trademark) manufactured and sold by Pacific Scientific Company, U.S.A. Measurement of the foreign matter content (the number of foreign matter particles having a size of from 0.5 to 25 µm) of a polycarbonate was performed with respect to a solution obtained by dissolving the polycarbonate in methylene chloride (solvent) in a concentration of 0.4% by weight, based on the weight of the methylene chloride.

(3) Anti-crazing properties

Pellets to be tested were subjected to injection molding in a clean room to obtain specimens each having a size of 20×200×3 mm. 7 specimens were immersed in hot water at 95° C. for 70 hours. After that period of time, the specimens were taken out from the hot water and then, allowed to stand in a room which had been adjusted to 25° C. and 50 RH %, for 24 hours. Subsequently, each of the specimens was individually sandwiched between 2 polarizing plates which were positioned so that the respective polarization directions of these polarizing plates were perpendicular to each other. Each specimen was visually observed through the polarizing plates, and the number of crazes present in the specimen was counted. In this way, the total number of crazes present in the 7 specimens was obtained. The anti-crazing propeties were evaluated in accordance with the relatively less magnitude of the total number of crazes.

EXAMPLE 1

A molten polycarbonate was produced from bisphenol A and diphenyl carbonate by the melt process, which polycarbonate had a viscosity average molecular weight of 24,500 and had a foreign matter content of 8,000/g in terms of the number of foreign matter particles having a size of from 0.5 to 25 µm. The produced polycarbonate was withdrawn from the polymerizer by means of a gear pump, and a thermal stabilizer [tris (2,4-di-t-butylpheny) phosphite] was added to the polycarbonate in a concentration of 100 ppm by weight, and then the resultant mixture was fed to a vented twin-screw extruder (extrusion temperature: 280° C.). A molten resin strand was extruded through the die of the extruder (orifice diameter of the die: 5.5 mm). The extruded molten resin strand was led into and passed through a strand bath having a length of 1 m which was filled with 60° C. water (cooling water) having an electric conductivity of 1 µS/cm and having a foreign matter content of 1/ml in terms of the number of foreign matter particles having a size of from 0.5 to 25 µm. [The cooling water had been obtained by purifying tap water with an ion exchange resin (water purifier G-10 manufactured and sold by Japan Organo Co., Ltd., Japan) and an ultrafiltration membrane (SIP3013 manufactured and sold by Asahi Chemical Industry Co., Ltd., Japan).] The cooled resin strand was taken out from the cooling water into the air, and the cooling water remaining on the surface of the strand was caused to scatter away by a clean-air blow. Then, the strand was subjected to cutting by means of a pelletizer to obtain polycarbonate pellets each having a diameter of 2.5 mm and a length of 3 mm. The obtained pellets had a foreign matter content of 8,120/g in terms of the number of foreign matter particles having a size of from 0.5 to 25 µm.

When the anti-crazing properties of the obtained pellets were examined, no occurrence of crazing was observed.

EXAMPLE 2

Substantially the same procedure as in Example 1 was repeated except that, as the cooling water, use was made of 60° C. distilled water having an electric conductivity of 12 µS/cm and having a foreign matter content of 83/ml in terms of the number of foreign matter particles having a size of from 0.5 to 25 µm. When the anti-crazing properties of the obtained pellets were examined, no occurrence of crazing was observed.

EXAMPLE 3

Substantially the same procedure as in Example 1 was repeated except that, as the cooling water, use was made of 60° C. distilled water having an electric conductivity of 128 µS/cm and having a foreign matter content of 2131/ml in terms of the number of foreign matter particles having a size of from 0.5 to 25 µm. When the anti-crazing properties of the obtained pellets were examined, two crazes were observed.

COMPARATIVE EXAMPLE 1

Substantially the same procedure as in Example 1 was repeated except that, as the cooling water, use was made of 60° C. tap water having an electric conductivity of 50 mS/cm and having a foreign matter content of 15,867/ml in terms of the number of foreign matter particles having a size of from 0.5 to 25 µm. When the anti-crazing properties of the obtained pellets were examined, 37 crazes were observed.

COMPARATIVE EXAMPLE 2

Substantially the same procedure as in Example 1 was repeated except that, as the cooling water, use was made of 60° C. industrial water having an electric conductivity of 72 mS/cm and having a foreign matter content of 210,512/ml in terms of the number of foreign matter particles having a size of from 0.5 to 25 µm. When the anti-crazing properties of the obtained pellets were examined, 49 crazes were observed.

COMPARATIVE EXAMPLE 3

Substantially the same procedure as in Example 1 was repeated except that, as the cooling water, use was made of 60° C. after having an electric conductivity of 63 mS/cm and having a foreign matter content of 3/ml in terms of the number of foreign matter particles having a size of from 0.5 to 25 µm. [The cooling water had been obtained by purifying industrial water having an electric conductivity of 72 mS/cm and having a foreign matter content of 210,512/ml in terms of the number of foreign matter particles having a size of from 0.5 to 25 µm with an ultrafiltration membrane (SIP3013 manufactured and sold by Asahi Chemical Industry Co., Ltd., Japan).] When the anti-crazing properties of the obtained pellets were examined, 27 crazes were observed.

EXAMPLE 4

Substantially the same procedure as in Example 1 was repeated except that, as the cooling water, use was made of 60° C. water having an electric conductivity of 113 µS/cm and having a foreign matter content of 1/ml in terms of the number of foreign matter particles having a size of from 0.5 to 25 µm. [The cooling water had been obtained by purifying the same distilled water as used in Example 3 with an ultrafiltration membrane (SIP3013 manufactured and sold by Asahi Chemical Industry Co., Ltd., Japan).] When the anti-crazing properties of the obtained pellets were examined, 2 crazes were observed.

EXAMPLE 5

A polycarbonate powder was produced from bisphenol A and phosgene by the phosgene process, which polycarbonate had a viscosity average molecular weight of 23,700. A thermal stabilizer [tris (2,4-di-t-butylpheny) phosphate] was added to the polycarbonate powder in a concentration of 100 ppm by weight, and then the resultant mixture was fed to a vented twin-screw extruder (extrusion temperature: 280° C.). A molten resin strand was extruded through the die of the extruder (orifice diameter of the die: 5.5 mm). The extruded molten resin strand was led into and passed through a strand bath having a length of 1 m which was filled with the same 60° C. distilled water (cooling water) as used in Example 3. The cooled resin strand was taken out from the cooling water into the air, and the cooling water remaining on the surface of the strand was caused to scatter away by a clean-air blow. Then, the strand was subjected to cutting by means of a pelletizer to obtain polycarbonate pellets each having a diameter of 2.5 mm and a length of 3 mm.

When the anti-crazing properties of the obtained pellets were examined, 8 crazes were observed.

EXAMPLE 6

Substantially the same procedure as in Example 3 was repeated except that, the temperature of the cooling water was changed to 13° C. When the anti-crazing properties of the obtained pellets were examined, 11 crazes were observed.

EXAMPLE 7

Substantially the same procedure as in Example 1 was repeated except that, as the cooling water, use was made of 60° C. water having an electric conductivity of 304 µS/cm and having a foreign matter content of 34,200/ml in terms of the number of foreign matter particles having a size of from 0.5 to 25 µm. [The cooling water had been obtained by purifying the same industrial water as used in Comparative Example 2 with an ion exchange resin (water purifier G-10 manufactured and sold by Japan Organo Co., Ltd., Japan).] When the anti-crazing properties of the obtained pellets were examined, 14 crazes were observed.

INDUSTRIAL APPLICABILITY

According to the present invention, there can be obtained a polycarbonate pellet improved with respect to the suppression of occurrence of crazing even when the pellet has experienced moist heat environment conditions. The polycarbonate pellet of the present invention is improved with respect to the suppression of occurrence of crazing even when the pellet has experienced moist heat environment conditions. Therefore, the polycarbonate pellet of the present invention can be advantageously used for the production of a molded polycarbonate product which is suitable for use in fields (such as the medical field and food-related field) in which a molded polycarbonate product is repeatedly subjected to sterilization by means of hot water or steam, and an optical field (such as an optical disc) in which an optical defect caused by the occurrence of crazing in a molded polycarbonate product is a serious problem.

We claim:

1. A method for producing a polycarbonate pellet which comprises subjecting a melt-extruded polycarbonate to a cooling step and a cutting step, said steps being carried out in either order or simultaneously, and wherein said cooling step is performed by contacting said polycarbonate with a cooling water having an electric conductivity of 1 mS/cm or less as measured at 25° C.

2. The method according to claim 1, wherein said cooling water has a foreign matter content of $10^5$/ml or less, as measured at 25° C., in terms of the number of foreign matter particles therein having a size of from 0.5 to 25 µm.

3. The method according to claim 1, wherein said cooling water has an electric conductivity of $10^2$ µS/cm or less as measured at 25° C. and has a foreign matter content of $10^4$/ml or less, as measured at 25° C., in terms of the number of foreign matter particles therein having a size of from 0.5 to 25 µm.

4. The method according to any one of claims 1 to 3, wherein said cooling water has a temperature in the range of from 40° C. to lower than 100° C.

5. The method according to any one of claims 1 to 3, wherein, after carrying out said cooling step, an additional step is carried out of removing said cooling water which remains on the surface of the polycarbonate.

6. The method according to claim 4, wherein, after carrying out said cooling step, an additional step is carried out of removing the cooling water which remains on the surface of the polycarbonate.

7. The method according to any one of claims 1 to 3, wherein said polycarbonate is produced by a transesterification reaction between an aromatic dihydroxy compound and a carbonic diester.

8. The method according to claim 4, wherein said polycarbonate is produced by a transesterification reaction between an aromatic dihydroxy compound and a carbonic diester.

9. The method according to claim 5, wherein said polycarbonate is produced by a transesterification reaction between an aromatic dihydroxy compound and a carbonic diester.

* * * * *